(12) United States Patent
Ruel et al.

(10) Patent No.: US 12,407,726 B2
(45) Date of Patent: Sep. 2, 2025

(54) OVERLAY NETWORK INGRESS EDGE REGION SELECTION

(71) Applicant: Akamai Technologies, Inc., Cambridge, MA (US)

(72) Inventors: Ryan Ruel, Cambridge, MA (US); Fardad Farahmand, Cambridge, MA (US); Brandon O. Williams, Revere, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 565 days.

(21) Appl. No.: 17/335,121

(22) Filed: Jun. 1, 2021

(65) Prior Publication Data

US 2021/0288865 A1 Sep. 16, 2021

Related U.S. Application Data

(63) Continuation of application No. 15/392,649, filed on Dec. 28, 2016, now Pat. No. 11,025,477.
(Continued)

(51) Int. Cl.
*H04L 29/00* (2006.01)
*H04L 9/40* (2022.01)
(Continued)

(52) U.S. Cl.
CPC ........ *H04L 63/164* (2013.01); *H04L 12/4633* (2013.01); *H04L 63/0272* (2013.01);
(Continued)

(58) Field of Classification Search
CPC ............... H04L 63/164; H04L 12/4633; H04L 63/0272; H04L 63/061; H04L 61/2514;
(Continued)

(56) References Cited

U.S. PATENT DOCUMENTS

| | | | |
|---|---|---|---|
| 6,742,044 B1 * | 5/2004 | Aviani | H04L 67/1001 709/227 |
| 2006/0156402 A1 * | 7/2006 | Stone | H04L 45/32 713/188 |
| 2007/0047446 A1 * | 3/2007 | Dalal | H04L 45/38 370/237 |
| 2008/0132224 A1 * | 6/2008 | Gallagher | H04W 12/08 455/422.1 |

(Continued)

*Primary Examiner* — Jeffrey C Pwu
*Assistant Examiner* — Helai Salehi
(74) *Attorney, Agent, or Firm* — David H. Judson

(57) ABSTRACT

This disclosure relates to enhanced overlay network-based transport of traffic to and from customer branch office locations, facilitated through the use of the Internet-based overlay routing. A method of selecting an ingress edge region of the overlay network begins by mapping a service hostname to an IKEv2 destination of an outer IPsec tunnel associated with a first overlay network edge. An IKEv2 session is established from the first overlay network edge to the customer router. Upon tunnel establishment, a secondary lookup is performed to determine whether the first overlay network edge is an appropriate ingress region. Based on a response to the secondary lookup, a IKEv2 redirect is issued to a second overlay network edge. A new tunnel is then established from the second overlay network edge to the customer router. Thereafter, an additional lookup may also be performed to determine whether the second overlay network edge remains an appropriate ingress region.

8 Claims, 4 Drawing Sheets

Related U.S. Application Data

(60) Provisional application No. 62/273,479, filed on Dec. 31, 2015.

(51) Int. Cl.
*H04L 12/46* (2006.01)
*H04L 61/2514* (2022.01)
*H04L 61/4511* (2022.01)

(52) U.S. Cl.
CPC ........ H04L 63/061 (2013.01); *H04L 61/2514* (2013.01); *H04L 61/4511* (2022.05); *H04L 63/0485* (2013.01); *H04L 63/068* (2013.01); *H04L 63/20* (2013.01)

(58) Field of Classification Search
CPC ............. H04L 61/4511; H04L 63/0485; H04L 63/068; H04L 63/20
See application file for complete search history.

(56) References Cited

U.S. PATENT DOCUMENTS

| | | | |
|---|---|---|---|
| 2010/0142447 A1* | 6/2010 | Schlicht | H04W 4/20 370/328 |
| 2013/0089093 A1* | 4/2013 | Bacthu | H04L 45/64 370/390 |
| 2017/0064749 A1* | 3/2017 | Jain | H04L 67/1097 |

* cited by examiner

OVERLAY NETWORK INGRESS EDGE REGION SELECTION

BACKGROUND

Technical Field

This application relates generally to overlay network routing over the publicly-routed Internet.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

A wide area network (WAN) is a telecommunications network e.g., with links across metropolitan, regional, national or international boundaries, that covers a broad geographical area, typically using leased telecommunication lines. Enterprises and government entities utilize WANs to relay data among employees, clients, buyers, and suppliers from various geographical locations. For example, a WAN commonly is used to connect local area networks (LANs) and other types of networks together, so that users and computers in one location can communicate with users and computers in other locations. Many WANs are built for one particular organization and are private. Other types of WANs include those built by Internet service providers, and these can be used to provide connections from an organization's LAN to the Internet. When a WAN is built using leased lines, a router positioned at each end of the leased line connects the LANs on each side to each other.

One common WAN approach using leased lines implements Multi-Protocol Label Switching (MPLS). MPLS is a standard-based technology for speeding up network traffic flow. In MPLS, a specific path (identified by a label) is set up for a given packet sequence, thereby obviating router look-up of a next address to which to forward the packet. MPLS works with various types of network protocols, such as IP, ATM and frame relay. While delivery over MPLS is efficient and secure, it also is expensive, primarily due to the cost of the leased line. As an alternative, WANs also can be built using less costly packet switching methods such as those that can take full advantage of the Internet's packet-switched network.

MPLS providers often must provide support for customers with branch offices that are not within reach of the provider's MPLS cloud. One common solution is for the MPLS provider to place VPN (IPsec) concentrators at the edge of their MPLS cloud. The provider may then provide the customer with a Customer Premises Equipment (CPE) device (e.g., a router) that will connect to a standard broadband Internet connection to connect to their MPLS services via the VPN concentrator. The number and location of the VPN concentrators, however, is often limited, resulting in varying performance depending on a branch office customer's location.

More generally, enterprises now desire to effectively utilize Internet links as an optimized wide area network (WAN), connecting branches, data centers, teleworkers and mobile users to applications over the Internet. Driven also by the impact of cloud computing and mobility, enterprises need a network service that can deliver an optimal and predictable cloud experience to users, preferably a network that is low-cost, easy-on, and global with security and optimization built-in.

BRIEF SUMMARY

The techniques herein provide for enhanced overlay network-based transport of traffic, such as IPsec traffic, e.g., to and from customer branch office locations, facilitated through the use of the Internet-based overlay routing infrastructure. This disclosure in particular describes a preferred method of selecting an ingress edge region of the Internet-based overlay network. The overlay network has an authoritative domain name service (DNS). Preferably, the method begins by receiving and mapping a service hostname to an IKEv2 destination of an outer IPsec tunnel associated with a first overlay network edge. The service hostname is received at the authoritative DNS from a DNS resolver associated with a customer router. An IKEv2 session is then established from the first overlay network edge to the customer router. Upon tunnel establishment, a secondary lookup is performed to determine whether the first overlay network edge is an appropriate ingress region. The secondary lookup is initiated to the authoritative DNS by the first overlay network edge. Based on a response to the secondary lookup, a IKEv2 redirect is issued from the first overlay network edge to a second overlay network edge. A new tunnel is then established from the second overlay network edge to the customer router. Thereafter, an additional lookup may also be performed to determine whether the second overlay network edge remains an appropriate ingress region. This additional lookup is initiated to the authoritative DNS by the second overlay network edge. Based on a response to the additional lookup, responses to one or more liveness probes otherwise being received over the new tunnel from the customer router may then be dropped, thereby triggering the customer router to initiate another service hostname lookup.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
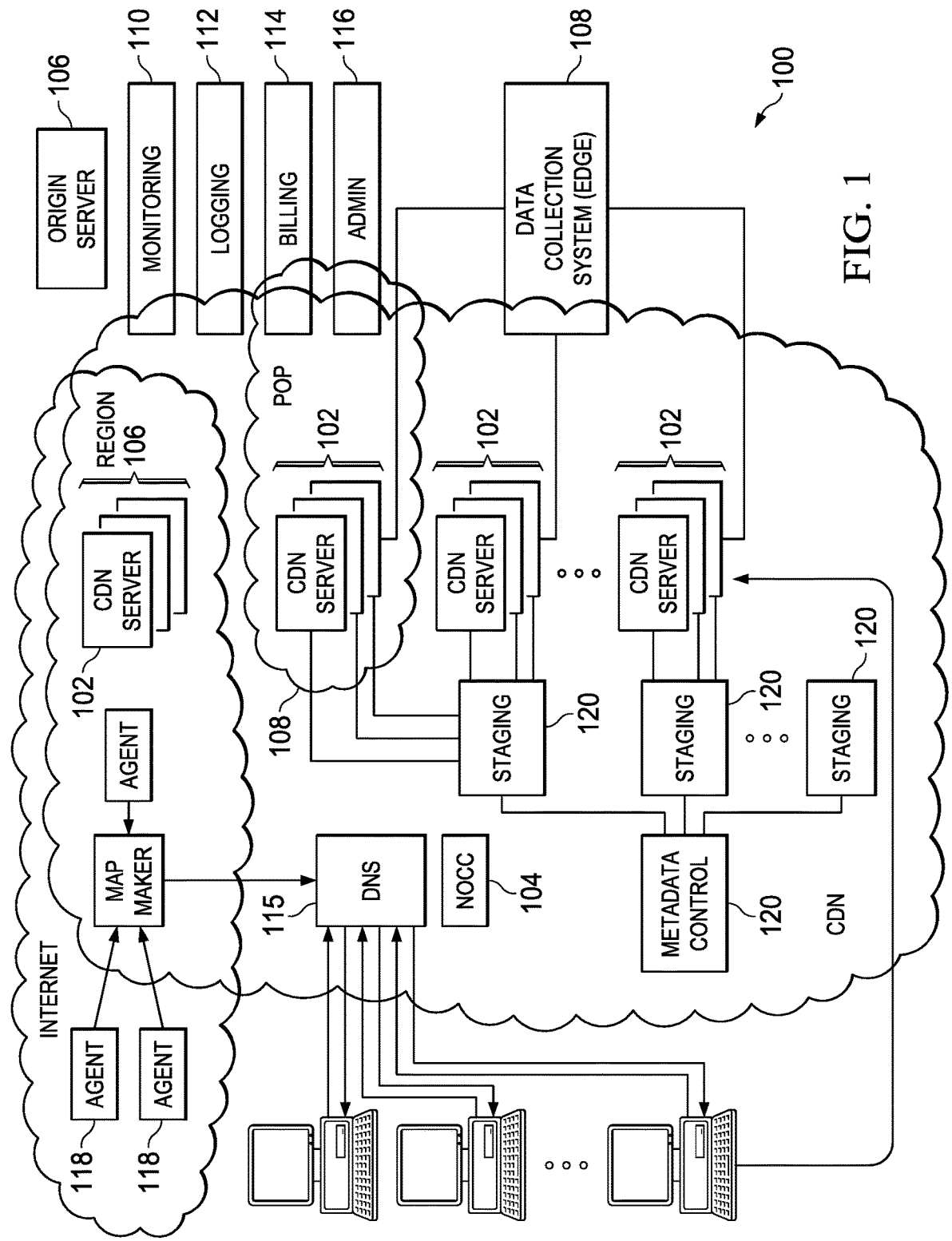
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
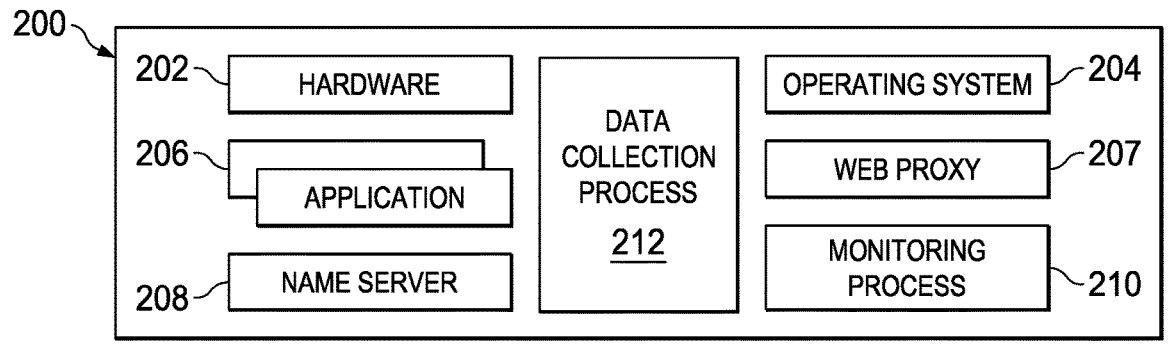
FIG. 2 is a representative CDN edge machine configuration.

As illustrated in FIG. 2, a given machine 200 in the content delivery network comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine may include one or more media servers, such as a Windows Media Server (WMS) or Flash server, as required by the supported media formats, or it may utilize HTTP-based delivery of chunked content fragments that constitute a stream.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

By way of further background, CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud. To accomplish these two use cases, CDN software may execute on virtual machines hosted in one or more customer data centers, and on virtual machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the service provider's other infrastructure (e.g., network and operations facilities. This type of managed solution provides an enterprise with the opportunity to take advantage of CDN technologies with respect to their Company's intranet.

As an overlay, the CDN resources such as described above also may be used to facilitate wide area network (WAN) acceleration services between enterprise data centers (which may be privately-managed) and third party software-as-a-service (SaaS) providers. The following provides additional details regarding this type of solution.

Figure 3:
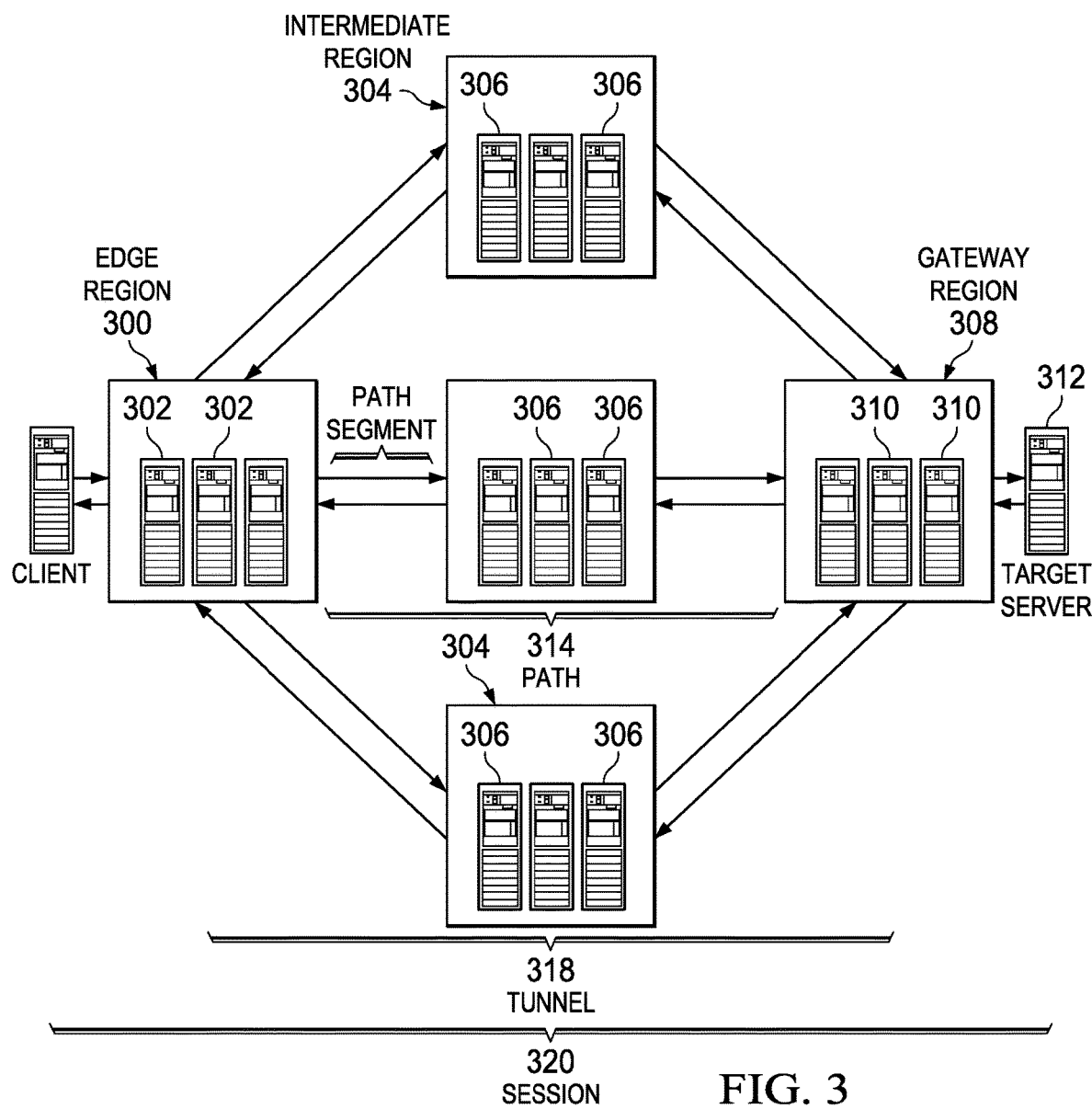
FIG. 3 is a known overlay solution whereby an overlay is positioned on top of the publicly-routable Internet.

In particular, FIG. 3 illustrates a known "overlay" network solution whereby an "overlay" is positioned on top of the publicly-routable Internet. This architecture is sometimes referred to as a "routing overlay" or "routing overlay network." The routing overlay network may leverage existing content delivery network (CDN) infrastructure, such as the infrastructure shown in FIGS. 1-2 above, and as provided by commercial services providers such as Akamai Technologies, Inc. of Cambridge, Massachusetts. An overlay network of this type provides significant performance enhancements for any application that uses Internet Protocol (IP) as a transport protocol by routing around down links or finding a path with a smallest latency. As is well known, the Internet Protocol (IP) works by exchanging groups of information called packets, which are short sequences of bytes comprising a header and a body. The header describes the packet's destination, which Internet routers use to pass the packet along until it arrives at its final destination. The body contains the application data. Typically, IP packets travel over Transmission Control Protocol (TCP), which provides reliable in-order delivery of a stream of bytes. TCP rearranges out-of-order packets, minimizes network congestion, and re-transmits discarded packets.

Many of the machines in the overlay are servers located near the edge of the Internet, i.e., at or adjacent end user access networks. As has been described above, e.g., FIG. 1, third party web sites and application providers offload delivery of content and applications to the network, which operates as a managed service. The overlay network includes distributed infrastructure for data collection, monitoring, logging, alerts, billing, management and other operational and administrative functions. As has been described and as shown in FIG. 2, a typical CDN machine comprises commodity hardware (e.g., an Intel® Pentium® processor) running an operating system kernel (such as Linux™ or variant) that supports one or more applications. To facilitate content delivery services, for example, given machines typically run a set of applications, such as an HTTP Web proxy, a name server, a local monitoring process, and one or more data collection processes. The Web proxy includes or has associated therewith an edge server manager process to facilitate one or more functions associated with the content delivery network.

A known OIP routing mechanism comprises a representative set of components, as illustrated in FIG. 3:

edge server 302—typically, a CDN edge server running an OIP edge server software process (oidp) as described below. As will be described, this software is responsible for receiving, encapsulating and forwarding IP packets.

edge region 300—typically, a CDN edge region configured for the overlay mechanism.

intermediate server 306—typically, a server that receives encapsulated packets from an edge region 300 or other intermediate servers and forwards them on to other intermediate servers or to a gateway region.

intermediate region 304—a region of intermediate servers.

gateway server 310—typically, an edge server that has been configured to receive encapsulated packets from the overlay, and that applies source network address translation (NAT) to the original packets and forwards them onto the target server.

gateway region 308—typically, a type of edge region comprising gateway servers and that is usually deployed on customer premises.

Target server 312—a machine whose traffic is to be tunneled through the overlay.

target address—the IP address of the target server; this address is sometimes referred to as a direct address when being compared to a CDN virtual IP address.

slot—a single "instance" of the overlay; preferably, a slot is a numbered index that corresponds to a single target address.

virtual IP address—typically, a CDN address that corresponds to a slot; preferably, there is one virtual IP address per edge region per slot. It is sometimes referred to as a VIP.

path 314—an ordered set of CDN regions between an edge region and a gateway region.

path Segment 316—a single hop of a path.

tunnel 318—a set of one or more paths from an edge server to a gateway server.

session 320—A single end-to-end connection from the client 322 to the target server; preferably, the session is defined by a five tuple (IP payload protocol, source address, destination address, source port, destination port). The source is the client and the destination is the target.

Figure 4:
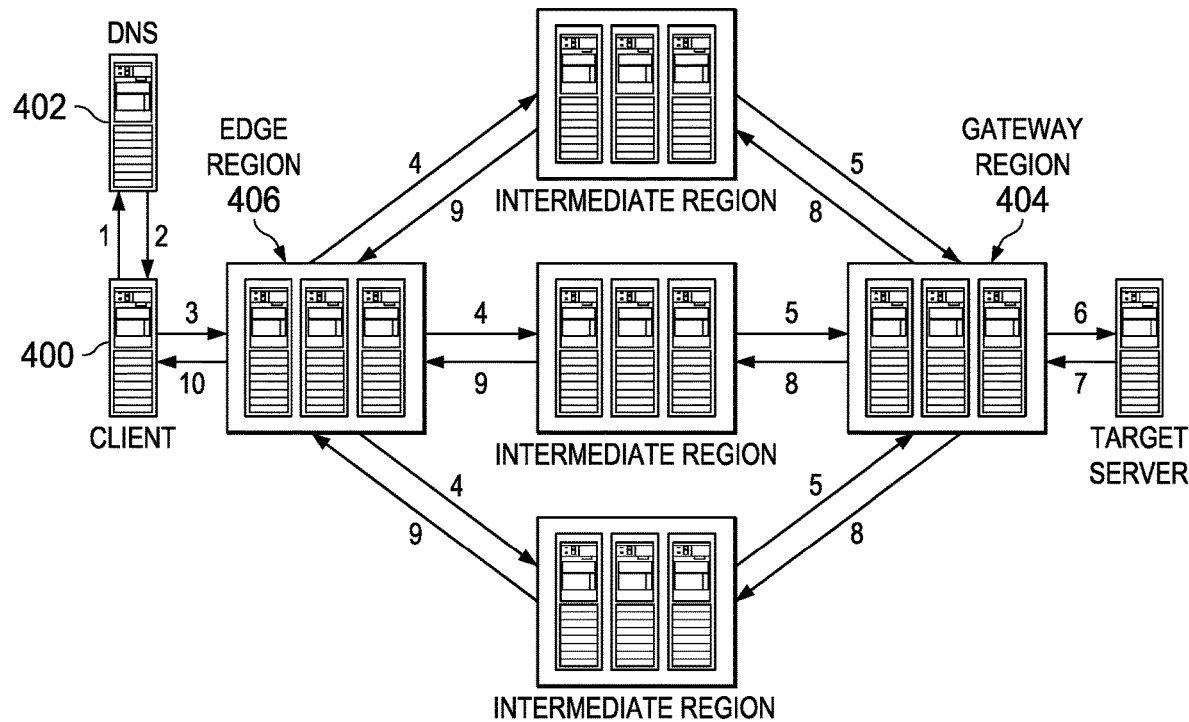
FIG. 4 illustrates a multi-path overlay IP (OIP) routing mechanism implemented within a content delivery network, such as shown in FIG. 1.

In one known use scenario of the overlay network, one or more clients desire to send packets to a single IP address. This is illustrated in FIG. 4 and is now described. At step 1, the client 400 makes a DNS request to resolve a hostname, typically a hostname associated with a web-accessible application. This hostname is aliased (e.g., by a CNAME) to a domain that is being managed by an authoritative DNS 402; typically, the authoritative DNS is managed by the CDN service provider. Preferably, this hostname corresponds to a single gateway region (and target address) 404. This is also referred to as a slot, as described above. At step 2, the DNS query returns a single IP address for the hostname. This address identifies a best performing available edge region 406 and, preferably, that region is dedicated to the hostname. The address is referred to as a virtual IP address, as described above. At step 3, the client 400 begins to send IP packets to the virtual IP address. These packets are received by a server in the edge region 406. The edge region 406 knows the gateway region 404 to which to send the packets based on the destination address in the IP packet header. The packet is then encapsulated. At step 4, and based on routes preferably provided by a CDN mapping system, the edge server in the edge region 406 sends out multiple copies of the encapsulated packets along multiple paths. One technique for performing this multiple path packet transport operation is described in U.S. Pat. Nos. 6,665,726 and 6,751,673, assigned to Akamai Technologies, Inc. As illustrated at step 5, several intermediate servers receive the encapsulated packets and forward them (either directly, or through other Intermediate Regions, not shown) to the gateway region 404, once again, preferably based on routes provided from the CDN mapping system. At step 6, the packets are received by a server in the gateway region 404, where duplicates are removed. Destination NAT translates the virtual IP to the target address and source Network Address Port Translation is applied to the packet before it is sent, so that the return traffic will also be sent over the overlay network. Preferably, information is stored so that return traffic is sent to the edge region 406 from which the client packet originated. At step 7, the gateway region 404 receives an IP packet from the target address and de-NATs the packet. The packet is then encapsulated. At step 8, multiple copies of the packet are sent along multiple paths. At step 9, the intermediate servers send the packets back to the original edge region for this session. At step 10, the packets are received by an edge server and duplicates are removed. The packet is sourced from the virtual IP address and then sent back to the edge region.

The various connections used in the overlay network and as described typically are secured via SSL or other transport layer security (TLS) techniques.

A virtual private network (VPN)-as-a-service (or more generally, "network-as-a-service") can be facilitated using an overlay IP (OIP) routing mechanism such as shown in FIG. 3. The notion of networking "as a service" enables enterprises to effectively utilize Internet links as an optimized wide area network (WAN), connecting branches, data centers, teleworkers and mobile users to applications over the Internet. Driven by the impact of cloud computing and mobility, enterprises need a network service that can deliver an optimal and predictable cloud experience to users, preferably a network that is low-cost, easy-on, and global with security and optimization built-in.

Figure 5:
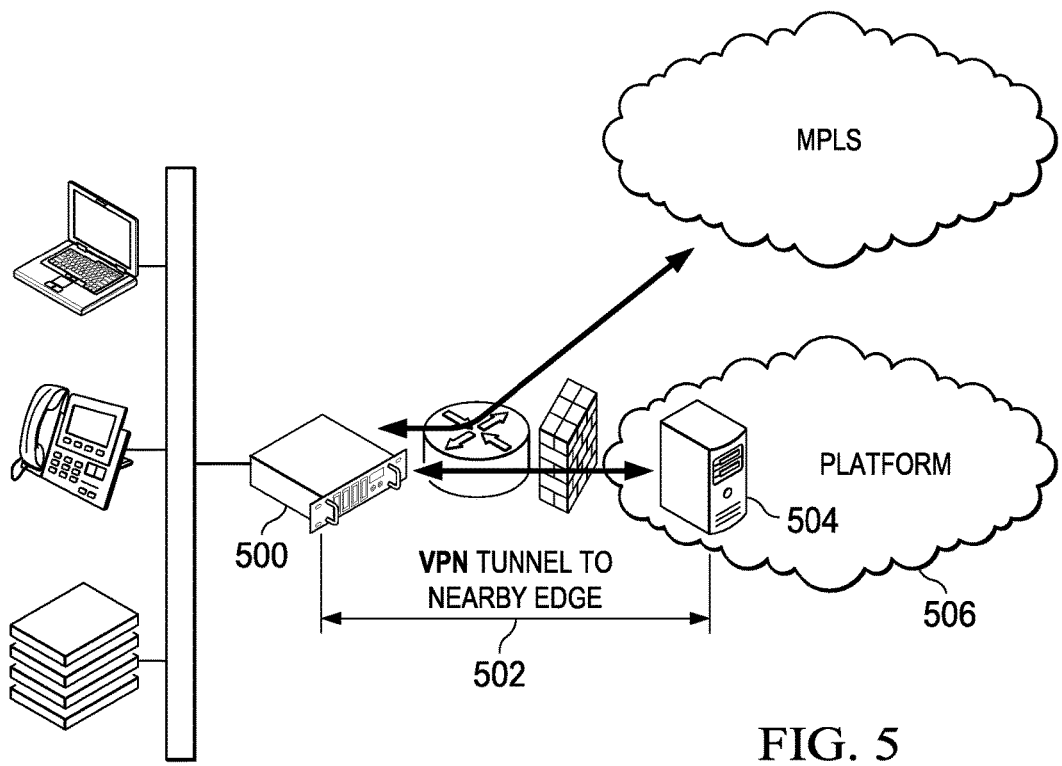
FIG. 5 illustrates a typical use case scenario for an enterprise that has a corporate data center to which are connected one or more branch locations, typically over wide area network Multi-Protocol Label Switching (MPLS)

FIG. 5 illustrates how an overlay network appliance 500 at one endpoint establishes a secure logical VPN tunnel 502 to a nearby edge region or regions 504 of the overlay network 506. In this context, the network appliance 500 typically provides IPSec-based authentication and flow-based encryption, and the secure logical VPN tunnel 502 may incorporate one or more encrypted flows. Preferably, the edge 504 uses communications (e.g. keep-alive signaling) to maintain the tunnel through the enterprise firewall 508. When the overlay network customer desires to connect its local (inside the firewall) network, it can use the Internet-based overlay by having the appliances positioned at or adjacent to each endpoint when the local network connects to the Internet.

A description of this network-as-a-service approach is provided in U.S. Publication No. 2015/0188943.

With the above as background, the techniques herein provide for enhanced overlay network-based transport of traffic, such as IPsec traffic, e.g., to and from customer branch office locations, facilitated through the use of the Internet-based overlay routing infrastructure described above.

The following describes a new type of edge region, referred to a NEdge, which is used as an entry point for delivery of IPSec tunnel traffic using the overlay network's existing routing and loss-mitigation capabilities to provide improved reliability when compared to the standard Internet. An NEdge typically will include a set of edge machines, such as the machine shown in FIG. 2, and that executes one or more overlay network processes. Preferably, the end-to-end IPsec traffic is delivered to the NEdge from the customer site using an authenticated outer IPsec tunnel originating from a router. Details of the outer and inner tunnel mechanisms are described in the above-identified publication.

By way of background, a typical router is a dynamic multipoint VPN (DMVPN) router, although this is not a limitation. A router of this type typically includes a network controller component, and it allows for secure connectivity from branch offices to hub routers (spoke to hub), as well as for branch to branch (spoke to spoke) connections. The overlay network transports DMVPN traffic between branch routers and hub routers (spoke to hub), as well as between branch to branch (spoke to spoke) routers. Typically, IKEv2 is used to authenticate routes with the overlay network, and the established IPsec tunnel is then used to authenticate DMVPN data traffic within the network. In this approach, an IKEv2 identifier payload is used to correlate IKEv2 traffic with a particular customer and to locate an appropriate secret to use for the IKEv2 authentication. When DMVPN routers communicate with one another, they establish an end-to-end IPsec tunnel using the Internet Key Exchange (IKE). This control plane IKE negotiation is performed over a pre-established outer authentication tunnel into the overlay network. Once the end-to-end (router-to-router) IPsec tunnels are established via IKE, data-plane IPsec packets for those tunnels are routed out a DMVPN GRE interface on the router, and are then routed to a best overlay network edge over the pre-established outer authentication tunnel. This edge selection is described in more detail below as the primary aspect of this disclosure. The notion of "best" is not meant to refer to some absolute requirement, but may be relative.

In one approach, the overlay network provider does not have visibility into the customer end-to-end traffic. Data packets transmitted between a router and the overlay network edge (and vice versa) use the additional layer of IPsec to restrict access to the overlay network. This additional layer of IPsec authenticates customer traffic with the service. This additional IPsec authentication layer is applied at the ingress to the overlay network but then stripped off at the edge before being forwarded to the rest of the overlay network.

Figure 6:
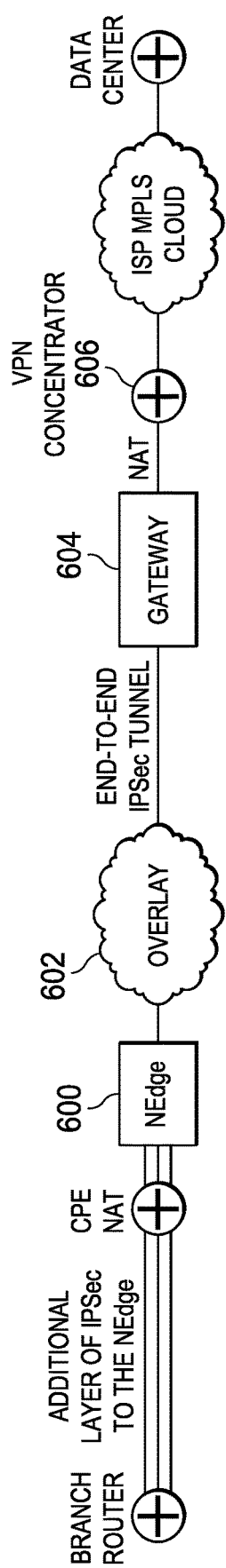
FIG. 6 depicts an end-to-end customer operating environment in which the techniques of this disclosure may be implemented.

In an alternative, and according to one aspect of this disclosure, the outer IPsec tunnel is only established between the branch office router and the NEdge. FIG. 6 depicts this embodiment. Here, NEdge 600 is positioned at the ingress to the overlay network 602, and there is an overlay network gateway 604 on the other side. Traffic between the gateway 604 and the VPN concentrator (UDP) 606 is simply NAT'd at the gateway 604 and sent directly to the VPN concentrator. In other words, there is no tunnel back from the VPN concentrator to the gateway. In this approach, preferably the gateway 604 is used as an anchor point for the end-to-end inner tunnel connection.

As further background, the customer's routers (typically located behind the firewall) periodically send liveness probes to the NEdge, typically to facilitate best route selection as will be seen. DMVPN liveness probes are essentially ICMP echo packets. These packets are not encrypted within the inner IPsec tunnel. To a router then, receipt of replies from the NEdge indicates that the authentication tunnel is functioning properly. The NEdge machine turns these packets around (into an ICMP response), re-applies authentication, and then sends the response back to the edge router via the authentication tunnel. Should a router not receive a valid response from the NEdge, it will cease using the tunnel as a valid route for data packets, and will failover to another route option (such as the public Internet of a dedicated circuit).

Ingress Edge Region Selection

Figure 7:
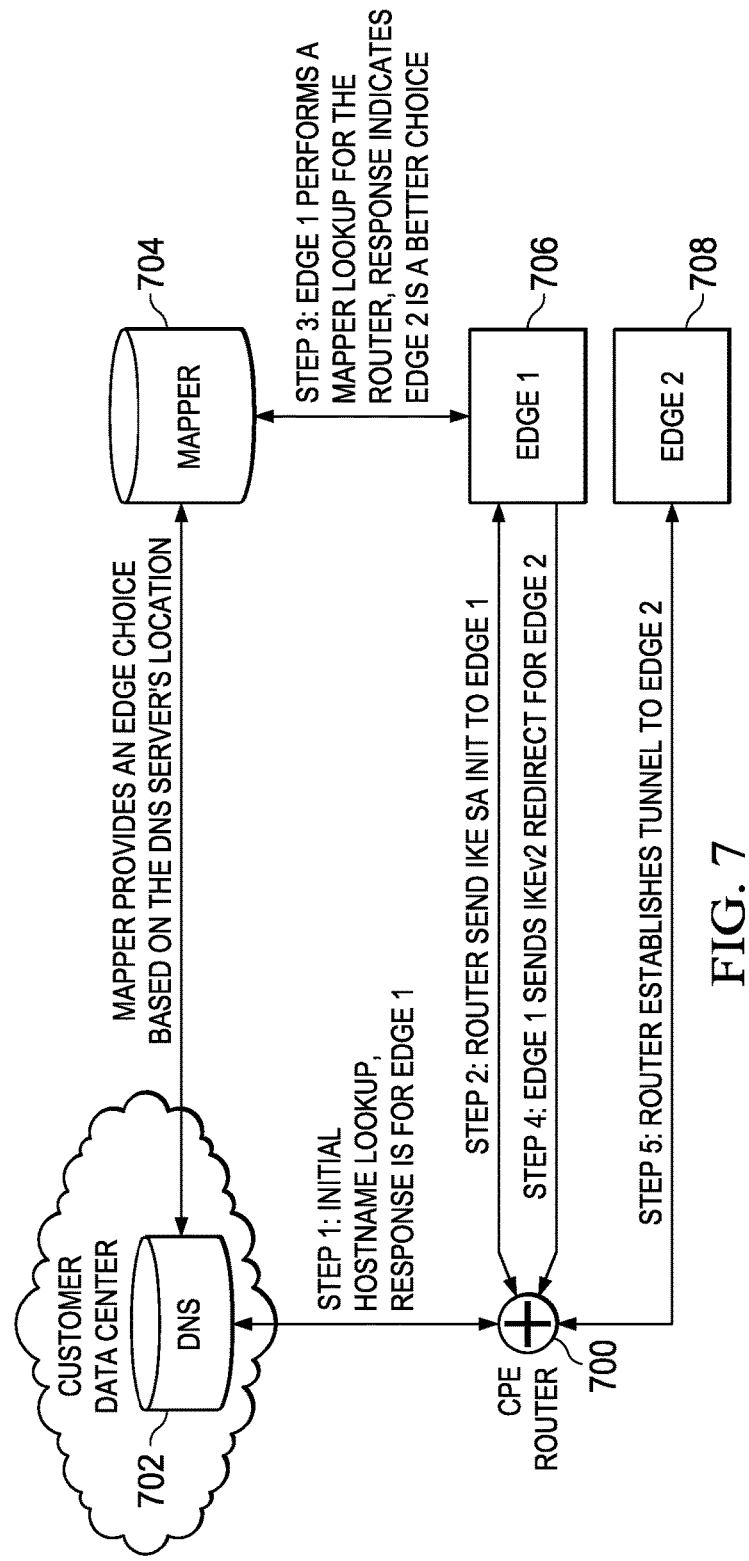
FIG. 7 depicts the ingress edge region selection mechanism of this disclosure

According to this disclosure, CPE devices (e.g., customer edge routers) are configured to perform initial first mile edge selection, typically using a DNS request. The IKEv2 destination for the outer IPsec tunnels into the overlay network is configured with an overlay network hostname for the service. The CPE routers are typically configured to use a standard corporate DNS resolver to perform hostname resolution. FIG. 7 depicts this scenario, with the CPE router 700 shown connecting to the corporate DNS resolver 702, with step (1) shown as the initial hostname lookup. As such, the DNS response back from the overlay network authoritative DNS 704 (the "Mapper") may not contain an edge address appropriate for the CPE router's location, but will instead be appropriate for the DNS resolver location (typically located in a data center). The CPE router will then establish an IKEv2 session to the edge region (in this case Edge 1 706, which is an NEdge region) provided by the overlay network authoritative DNS response. This is step (2). To ensure that the CPE router uses an optimal edge choice (where "optimal" may be a relative term), however, on tunnel establishment the overlay network edge itself (in this case Edge 1) also performs an overlay network DNS lookup for the router IP address. This is depicted as step (3). Based on this lookup, Edge 1 may determine that it is not the best choice but, rather, Edge 2 708 is better. Should the edge determine it is not the best choice for a particular router, according to this disclosure the edge (originally selected) sends an IKEv2 redirect (RFC-5865) notify message to redirect the router (on IKE_SA_INIT) to the optimal edge choice (as determined by the secondary DNS lookup). This redirect is depicted at step (4), and it serves to direct the router 700 to Edge 2 708 (typically another NEdge region) in this example.

Preferably, both the DNS request and IKEv2 redirect mechanisms are only repeated at the time of tunnel establishment, or at the time of an IKE re-key event. Thus, there may be operating scenarios where there is a need for additional mechanisms to drive the router to reconnect to a different NEdge region. This additional aspect of the disclosure is now described.

In order to monitor the reachability of the active NEdge being used, IP-SLA's (liveness probes) are used to detect any failure of the tunnel. As noted above, IP-SLA probes are sent over the tunnel to ensure connectivity using the tunnel. In addition, preferably NEdge performs periodic Mapper lookups on behalf of the routers connected into that edge region. Should the edge determine via this lookup that it is no longer a valid choice for a given router, it will begin to drop the IP-SLA probes sent over the tunnel from that router. If IP-SLA probes fail for any reason (either unintentional or deliberate), typically an event manager running in the router triggers an event that executes a local router action to use an alternate tunnel. As such, the NEdge can trigger this result by intentionally dropping the IP-SLA to indirectly signal the router to look for a new edge region.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The techniques herein generally provide for the above-described improvements to a technology or technical field, as well as the specific technological improvements to various fields including distributed networking, Internet-based overlays, WAN-based networking (using MPLS or otherwise), secure utilization of Internet links, and the like, all as described above.

Having described our invention, what we claim is set forth below.

The invention claimed is:

1. A method of selecting an ingress edge region of an Internet-based overlay network, the overlay network having an authoritative domain name service (DNS), comprising:

mapping, using the authoritative DNS, a service hostname to a first overlay network edge;

establishing a first destination tunnel from the first overlay network edge to a customer router;

upon establishment of the first destination tunnel, receiving one or more connectivity-related messages from the customer router;

re-mapping the service hostname to determine whether the first overlay network edge remains an appropriate ingress region for the first destination tunnel, wherein re-mapping includes intentionally dropping a response to at least one connectivity-related message from the customer router, thereby triggering the customer router to initiate a new lookup of the service hostname at the authoritative DNS;

when a result of the re-mapping determines that the first overlay network edge is not an appropriate ingress edge region for the first destination tunnel but a second overlay network edge is an appropriate ingress edge region, redirecting from the first overlay network edge to the second overlay network edge; and establishing a second destination tunnel from the second overlay network edge to the customer router.

2. The method as described in claim 1, wherein re-mapping includes performing one or more lookups to the authoritative DNS to determine whether the first overlay network edge remains an appropriate ingress region for the first destination tunnel.

3. The method as described in claim 1, wherein the one or more connectivity-related messages are one or more liveness probes.

4. The method as described in claim 1, wherein the first destination tunnel is an IKEv2 destination of an outer IPsec tunnel associated with the first overlay network edge.

5. The method as described in claim 1, wherein redirecting to the second overlay edge network uses an IKEv2 redirect notify message.

6. The method as described in claim 1, wherein the first and second overlay network edges are associated with distinct geographic regions.

7. The method as described in claim 1, wherein the Internet-based overlay network is a content delivery network (CDN) and the first and second overlay network edge are collections of CDN edge servers.

8. The method as described in claim 3, wherein the liveness probes are IP-SLA probes.

* * * * *